J. WELL.
SAW CLAMP.
APPLICATION FILED JAN. 17, 1918.
1,290,817.
Patented Jan. 7, 1919.
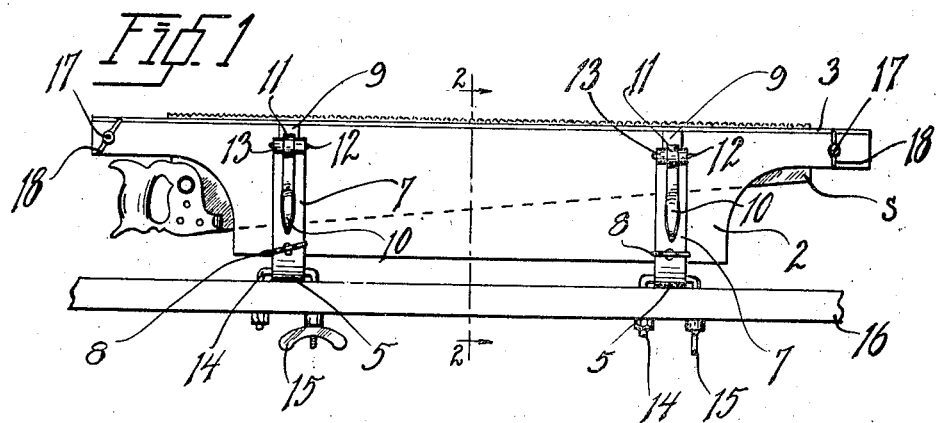
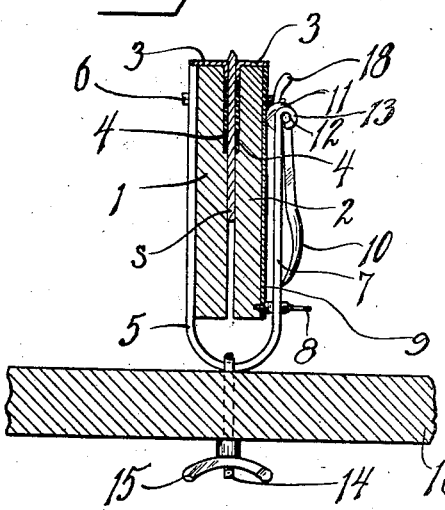
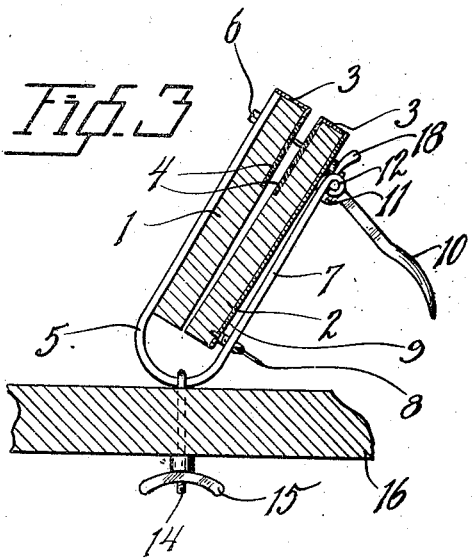
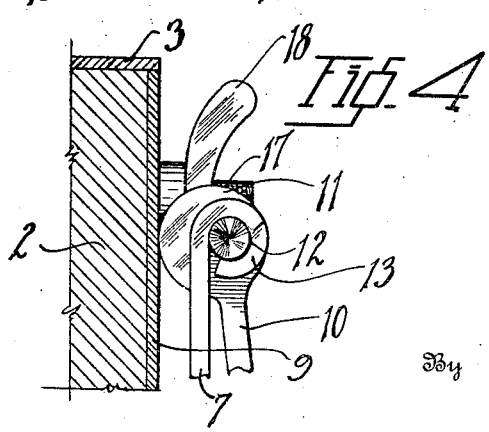
Inventor
JOHN WELL
By Herbert E. Smith
Attorney

UNITED STATES PATENT OFFICE.

JOHN WELL, OF SPOKANE, WASHINGTON.

SAW-CLAMP.

1,290,817.　　　　Specification of Letters Patent.　　　Patented Jan. 7, 1919.

Application filed January 17, 1918.　Serial No. 212,308.

*To all whom it may concern:*

Be it known that I, JOHN WELL, a citizen of the United States, residing at Spokane, county of Spokane, and State of Washington, have invented certain new and useful Improvements in Saw-Clamps, of which the following is a specification.

The present invention relates to improvements in saw clamps, designed especially for use in setting and filing hand saws, and particularly intended and constructed for the purpose of rectifying and eliminating irregularities in the set of the teeth of the saw as will be described hereinafter.

The primary object of the invention is the provision of a simple, durable, and efficient tool or device of this character, which is comparatively inexpensive in first cost, and thus well within reach of artisans and others using saws.

In the accompanying drawings one complete example of the physical embodiment of the invention is illustrated showing the best mode I have so far devised for the practical application of the principles of the invention.

Figure 1 is a side elevation of a clamp or device built according to this invention, showing a saw therein ready for use.

Fig. 2 is a transverse sectional view through Fig. 1 at line 2—2, the device being shown on an enlarged scale in this view.

Fig. 3 is a similar view with the saw removed, and the clamp at an angle.

Fig. 4 is an enlarged, fragmentary, detail view showing one of the cam clamping devices.

In the preferred embodiment of the invention as illustrated in the drawings, the clamp involves in its construction the usual long jaws 1 and 2, preferably of wood, and of sufficient length to accommodate maximum length of hand saws. The upper edges and top surfaces of the jaws are each provided with an angle iron as 3, 3, which are trued in both vertical and horizontal or longitudinal directions to form straight edges and surfaces that are parallel and specially adapted to rectify and eliminate irregularities in the teeth of the saw. Just below the straight edges, on each jaw are secured friction strips 4, 4, which may be of rubber, or fabric impregnated with material to provide a surface that will prevent slipping of the saw, and which form cushions for the saw blade S when it is clamped between the jaws 1 and 2.

The jaws are preferably supported from a pair of U-shaped metallic brackets 5, 5, that are secured to one of the jaws, as 1 by bolts 6, and the other arm 7, which is resilient, is connected with the jaw 2 by a thumb screw 8 near the bottom edge of the jaw. The thumb screw is anchored to turn in a wear plate 9 which is a metallic strap secured to the jaw 2 and extending from top to bottom thereof so that it may receive pressure from the cam lever 10 whose head 11 engages the plate near the top of the jaw.

The cam lever is pivoted, through its head, at 12, and the upper end of each of the resilient arms of the two brackets, is bifurcated and the ends turned over and formed as ears 13 for the pivot so that the lever may be actuated with facility, and its head bear against the wear plate 9. It will thus be readily understood that the jaw 1 is fixed with relation to its supporting brackets, while the jaw 2 is movable with relation thereto, and actuated by the two cam levers to clamp the saw between the jaws.

Preferably the jaws and brackets are angularly adjustable, as indicated in Figs. 2 and 3, and for this purpose a pair of U-bolts 14 are passed through the curved or bent portions of the brackets, so that by turning the wing nuts 15 of the bolts 14 the brackets may be clamped on the work bench 16 in any desired position within limits.

In addition to the clamping devices furnished by the cam levers and cams, it is preferable that additional clamp screws 17 and nuts 18 be employed near the ends of the jaws, as indicated in Fig. 1.

The device may be used in usual manner to sharpen, file, and set the saw teeth, and an additional function of the apparatus resides in its utility for rectifying and regulating the set of the teeth, as well as affording a gage to insure uniformity in the altitude of the teeth. Thus, the saw blade may be clamped between the jaws with the teeth held between the straight edges formed by the angle irons, so that the set of the teeth may be removed if desired, or excessive set of the teeth may be eliminated to re-aline the teeth. Another meritorious feature of the device resides in the use to which it is put when the lower edges of the teeth are re-alined. Thus, to bring the points of the teeth in absolute alinement and eliminate hollows and projections, the straight edges of the jaws are brought into relation to the teeth so that, for instance, the straight edges are alined with the deepest hollow in the teeth of the blade, then the points of the teeth are filed off until they are all brought down flush with the straight edges. After realinement is established, the teeth may again be sharpened and reset as usual.

What is claimed is:—

The combination in a saw clamp comprising U-shape resilient brackets and a jaw fixed to an arm of each of the brackets, a relatively movable jaw, and a set screw connecting the lower edge of the movable jaw to the other arms of the brackets, and means coacting with the resilient brackets for clamping the jaws together.

In testimony whereof I affix my signature.

JOHN WELL.